United States Patent [19]
Nimberger

[11] Patent Number: 5,836,352
[45] Date of Patent: Nov. 17, 1998

[54] ENVIRONMENTAL FILL VALVE

[75] Inventor: Spencer M. Nimberger, Houston, Tex.

[73] Assignee: PGI International, Ltd., Houston, Tex.

[21] Appl. No.: 659,263

[22] Filed: Jun. 6, 1996

[51] Int. Cl.[6] .............................. F16K 55/18; F16K 31/44
[52] U.S. Cl. ....................... 137/614.19; 251/85; 251/109; 251/152; 251/263; 251/359
[58] Field of Search .............................. 137/614.19, 614, 137/15; 251/263, 109, 152, 85, 262, 359

[56] References Cited

U.S. PATENT DOCUMENTS

| | | | |
|---|---|---|---|
| 2,972,466 | 2/1961 | Allen et al. | 137/614.19 |
| 5,127,436 | 7/1992 | Campion et al. | 137/614.19 |
| 5,215,120 | 6/1993 | Nimberger et al. | 137/614.19 |
| 5,228,474 | 7/1993 | Nimberger | 137/614.04 |
| 5,320,133 | 6/1994 | Nimberger | 137/614.04 |

*Primary Examiner*—A. Michael Chambers
*Attorney, Agent, or Firm*—Browning Bushman

[57] ABSTRACT

Fill valve 10 controls the flow of propane from a fill line FL to a control valve CV mounted on a propane use tank T. The fill valve includes a valve body 12 having a propane inlet 20, an elongate sleeve 24 and a discharge housing 22 surrounding the elongate sleeve and having an external left-hand thread 30 for interconnection with a mating thread in the control valve. A nose tip 26 is secured to the elongate sleeve and has an external surface 68, an annular seal 70 for sealing engagement with the control valve, and a fill valve seat 100 defining a portion of a flow passage 66 therethrough. Valve stem 18 extends through the valve body and the elongate sleeve and is axially moveable between opened and closed positions. A lower end of the valve stem is positioned within the nose tip. A handle is pivotably connected to the valve stem. A fill valve seal 76 is carried on the valve stem for sealing engagement and disengagement with the fill valve seat 100. The fill valve seat and fill valve seal are provided closely adjacent the discharge end of the fill valve for minimizing loss of propane to the environment when the fill valve is disconnected from the control valve. According to the method of the invention, a barrel-shaped passageway within the nose valve tip is formed by a swaging operation to define the fill valve seat. After the swaging operation, the nose tip is machined in a finishing operation.

20 Claims, 4 Drawing Sheets

ENVIRONMENTAL FILL VALVE

FIELD OF THE INVENTION

The present invention relates to a valve of a type suitable for periodic filling a fuel storage vessel. More particularly, this invention relates to a improved fill valve for interconnection with a standard control valve mounted on a propane use tank. The fill valve of the present invention controls propane flow from a flexible hose extending from a large storage tank to the control valve and then to the smaller propane use tank. The fill valve may be closed and disconnected from the control valve without discharging significate amounts of propane to the environment.

BACKGROUND OF THE INVENTION

Propane tanks have long been used for home heating and cooking, and for limited commercial and industrial applications. The standard propane use tank includes a control valve for controlling the flow of propane from the use tank to a regulator and then to the fuel burner. To periodically refill the propane use tank, a large propane storage vessel is either transported to the propane use tank, or the propane use tank is transported to the large storage vessel. In either case, the propane use tank is conventionally filled by disconnecting the regulator and interconnecting a fill valve at the end of the flexible hose to the control valve mounted on the propane tank. The fill valve includes an elongate discharge nose for mated interconnection with threads internal of the control valve, and positions the fill valve handle outside a tank guard ring. Once the fill valve has been fluidly connected to the control valve, both the fill valve and the control valve are opened for releasing the pressurized propane from the large storage vessel to the propane use tank.

In order to reduce the time required to fill the propane use tank, the fill valve flow passageway is configured so that is does not substantially reduce the fluid flow from the flexible fill line to the propane use tank. The fill valve preferably is also of the type which may be reliably used by relatively inexperienced personnel. Preferably the fill valve is of quick-acting type with a handle which pivotably moves with respect to the valve body to move the stem from an opened position to a closed position. The fill valve is thus connected to the control valve, the operator pivots the handle to the opened position and quickly fills the propane use tank, then returns the handle to the closed position and disconnects the fill valve from the control valve.

A significant problem with the prior art propane fill valves is that the fill valve seat is spaced substantially from the end of the elongate discharge nose which is interconnected with the control valve. Accordingly, after the propane use tank is refilled and the fill valve and control valve are closed, propane in the elongate nose between the fill valve seat and the control valve seat is discharged to the environment when the fill valve is threadably disconnected from the control valve. In excess of 27 cc of pressurized propane is commonly released in a refilling operation, with the released pressurized propane expanding hundreds of times when vaporizing in the air. The cost of the discharged propane is nominal compared to the significant environmental impact caused by thousands of propane filling operations occurring daily in many locations. Also, the discharged propane may adversely affect the safety of the propane filling operator and others located in the vicinity of the filling operation.

The disadvantages of the prior art are overcome by the present invention, and an improved fill valve suitable for filling a propane use tank with a standard control valve mounted thereon is hereinafter disclosed.

SUMMARY OF THE INVENTION

The fill valve of the present invention may be used to reliably control the filling of a propane use tank with a conventional control valve mounted thereon. The fill valve includes a quick acting pivot handle which axially moves a valve stem between the opened and the closed positions. A coil spring biases the fill valve closed. The fill valve also includes an elongate discharge nose for insertion into the control valve after the regulator has been removed. A left hand thread is provided at the discharge end the elongate nose for mating connection with a corresponding thread within the interior of the control valve. The fill valve also includes a nose tip with an elastomeric external seal mounted thereon for reliable sealing engagement with a seat within the interior of the control valve. Propane flows in the annulus between the elongate nose and the valve stem, and is discharged through an aperture in the nose tip so as not to substantially restrict the flow of propane when the fill valve is in the opened position.

The valve stem extends from the pivot handle through the fill valve body and substantially through the elongate discharge nose. An elastomeric seal is provided on the end of the valve stem for reliable sealing engagement with a seat formed by an interior surface of the nose tip. The flow path within the nose tip has a substantially barrel-shaped configuration, so that the valve stem seal seals with a lower interior barrel surface when the handle is in the closed position. To avoid substantially restricting the flow of propane through the fill valve, the elastomeric seal is positioned approximately midway in the barrel-shaped flow path of the nose tip when the handle is the opened position.

Due to the size of the nose tip, it would be difficult and expensive to form a unitary nose tip with a barrel-shaped flow passageway using a conventional boring tool. According to the present invention, the nose tip is initially formed with a substantially cylindrical configuration flow path from an axial mid-point in the resulting barrel-shaped configuration to the discharge end of the nose tip. Initially, the outer surface of the nose tip similarly has a generally cylindrical configuration. Thereafter, the discharge end of the nose tip is deformed radially inwardly by a swaging operation, thereby forming the desired barrel-shaped flow passageway. After the swaging operation is complete, the generally frustoconical exterior surface of a nose tip is machined for reliable engagement with the mating seat within the control valve.

The handle end of the valve stem moves axially between the opened and the closed positions a distance which is longer than the axial movement of the elastomeric seal at the discharge end of the valve stem. As previously noted, the elastomeric seal desirably moves from a closed position in sealed engagement with a lower interior surface of the barrel-shaped flow path to the opened position wherein the seal is approximately midway within the interior of the barrel-shaped passageway. To accommodate this discrepancy, an adjustment mechanism is provided along the valve stem for allowing the handle end of the valve stem to move an axial distance greater than the discharge end of the valve stem when the handle moves the stem between the opened and the closed positions. The adjustment mechanism includes a lower stem slidable movable with respect to an upper stem. An adjustment mechanism spring biases the lower stem axially away from the upper stem, thereby allowing the lower stem and the elastomeric seal to move axially a distance less than the upper stem in response to movement of the handle from the closed to the opened positions. A large spring biases the upper valve stem to the closed position, and a small spring biases the lower valve stem to the closed position. The upper valve stem impacts the valve body so that high forces are not transmitted to the lower valve stem. The adjustment mechanism desirably cushions the sealing engagement of a seal on the lower valve stem against its seat, and avoids a tolerance stack-up problem between the stem seal and the seat.

It is an object of the invention to provide an improved fill valve of the type which may be used for filling a propane tank. The fill valve of the present invention includes an elongate discharge nose with an external seal provided on the nose tip for sealing with a seat in a convention control valve. The fill valve seal and seat are positioned closely adjacent the discharge end of the fill valve. The fill valve may thus be connected to the control valve mounted on the propane use tank, and very little propane is discharged to the environment when the fill valve is removed from the control valve.

It is a feature of the present invention that the fill valve is provided with a nose tip which includes a barrel-shaped passageway with a seat therein for sealing engagement with an elastomeric seal at the end of the valve stem. The elastomeric seal is spaced approximately mid-way in the barrel-shaped passageway when the fill valve is in the opened position so as not to substantially restrict the flow of propane through the fill valve.

Another feature of this invention is the low cost technique used for forming the barrel-shaped passageway in the nose tip of the fill valve. The lower end of the nose tip is initially formed with a generally cylindrical interior passageway and a similarly shaped exterior surface. The lower end is then deformed radially inwardly by a swaging operation, thereby forming the barrel-shaped interior passageway and deforming the exterior surface of the nose tip to a generally frustoconical configuration. After the swaging operation, the exterior surface of the nose tip is machined so that the nose tip will reliably seal with the mating seat provided within the interior of the control valve.

Another feature of the present invention is an adjustment mechanism provided along the valve stem which allows the handle end of the valve stem to move axially a distance greater than the discharge end of a valve stem when the handle is moved between the opened and the closed positions. The adjustment mechanism includes an interconnection between an upper stem and a lower stem which allows for sliding movement therebetween. The fill valve also includes a large biasing spring for biasing the upper stem to the closed position, and a small biasing spring for biasing the lower valve stem and stem seal to the closed position and away from the upper stem. The adjustment mechanism allows the upper valve stem to impact the valve body so that the seal on the lower valve stem is cushioned into sealing engagement with the seat, and obviates a stack-up problem which otherwise exists between the stem seal and the seat.

It is an advantage of the invention that the lower stem includes an alignment mechanism for substantially aligning the lower stem within the flow passageway in the elongate discharge nose of the fill valve. The lower stem may be provided with one or more alignment pins which slidably engage the interior surface of the passageway in the elongate nose when the handle moves between the opened and closed positions.

It is further advantage of this invention that the fill valve may be used is conjunction with existing control valves of the type conventionally mounted on propane tanks. It is estimated that several million such control valves are in operation. Accordingly, the fill valve of the present invention significantly reduces the discharge of propane to the environment but does not require modifications to the conventional control valve.

In the further advantage of the present invention that the fill valve may be manufactured at a cost which is not significantly greater than prior art fill valves, although the fill valve of the present invention has a significant advantage of reducing the discharge of propane to the environment.

These and other objects, features and advantages of the present invention will become apparent from the following detailed description, wherein reference is made to the figures in the accompanying drawings.

DETAILED DESCRIPTION OF PREFERRED EMBODIMENTS

The fill valve of the present invention is suitable for use in periodically filling a fuel storage tank, and particularly a propane use tank. Propane use tanks are widely used in many countries for home heating and cooking, and are also used in some commercial and industrial applications. During normal use of the propane tank, a regulator is threadably connected to a control valve (also referred to as a filler valve) mounted on the propane use tank to regulate output propane pressure, so that the user opens the control valve to control the flow of propane to a burner. The propane use tank must be periodically refilled from a large propane storage vessel. Depending on the practice in a particular locale and the desires of the propane user, the user may either transport the propane use tank to a large propane storage vessel to refill the propane use tank, or a service company may periodically bring a large propane storage tank by the home or business of the user to periodically fill the propane use tank.

The fill valve of the present invention is intended for interconnection with a standard control valve mounted on the propane use tank. A flexible fill line interconnects the large propane storage tank with the fill valve. To fill the propane use tank, the regulator is disconnected from the closed control valve and the fill valve is connected to the control valve. The fill valve and control valve are then opened to discharge the pressurized propane from the storage tank to the propane use tank. After the filling operation, the control valve and fill valve are closed, the fill valve is removed, and the regulator is again connected to the control valve.

Figure 1:
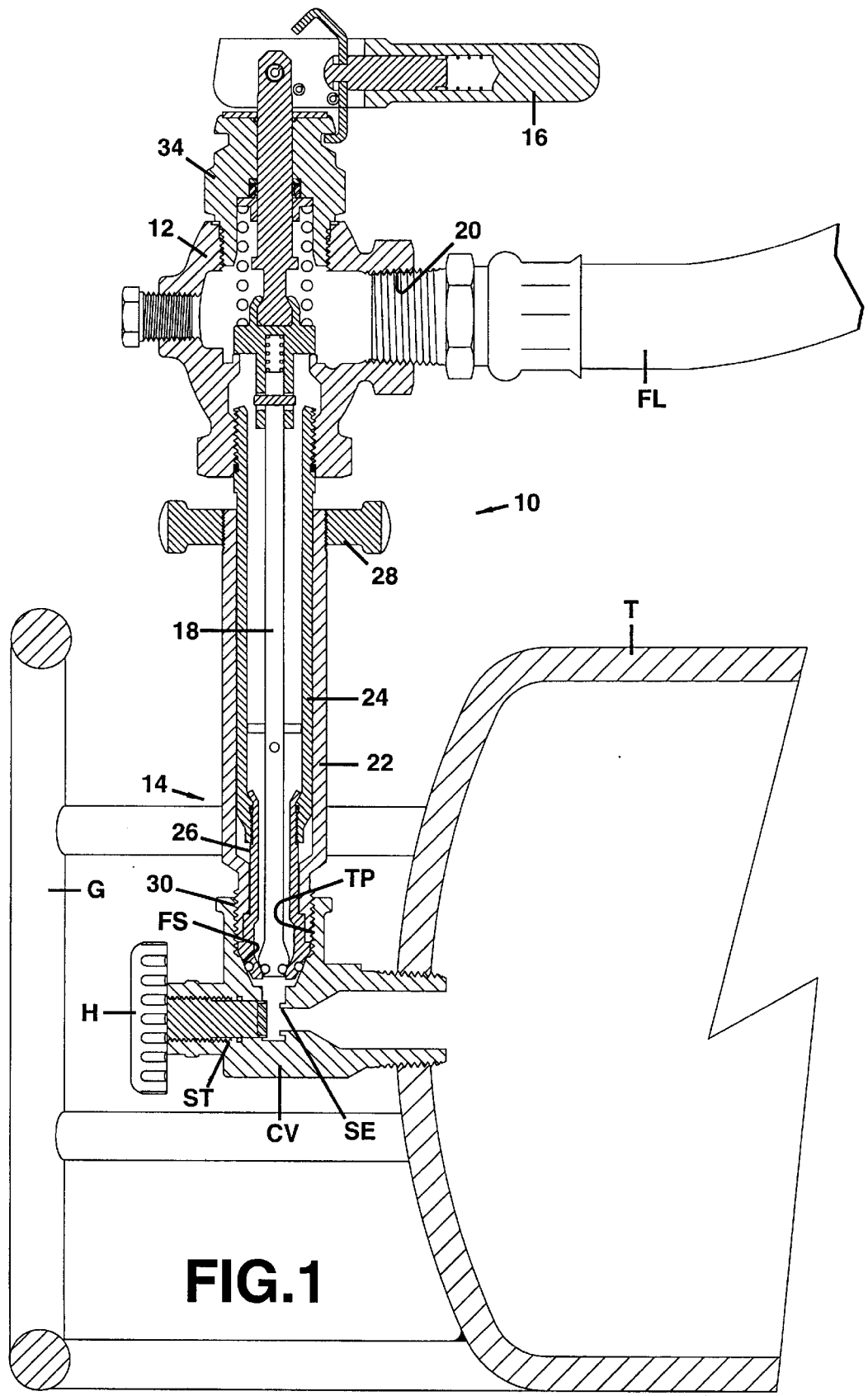
FIG. 1 is a simplified cross-sectional view of a fill valve according to the present invention interconnected with a conventional control valve mounted on a propane tank. A portion of a flexible hose for supplying pressurized propane to the fill valve is also depicted.

FIG. 1 depicts a fill valve 10 of the present invention, which includes a valve body 12, an elongate discharge nose 14, pivot handle 16, and a valve stem 18 discussed further below. A portion of a flexible fill line FL is depicted connected to threaded inlet port 20 in the valve body 12. Those skilled in the art will appreciate that the fill line FL extends from a large propane storage tank (not shown) to the fill valve 10. The fill valve 10 is shown connected to a conventional propane filler valve or control valve CV, which in turn is threadably mounted on a propane use tank T. The handle H of the control valve CV may be rotated to engage and disengage the control valve stem ST with the control valve seat SE, thereby closing and opening the control valve.

The propane use tank T conventionally includes a ring guard G which protects the control valve. The elongate discharge nose 14 of the fill valve 10 thus spaces the operating handle for the fill valve laterally from the control valve CV, and preferably laterally opposite the guard G with respect to the control valve CV, to easily and safely interconnect the equipment as shown in FIG. 1 and to accomplish the filling operation. The fill valve 10 is shown in its vertical position in the figures for ease of reference. It should be understood that the terms "top" or "upper" and "bottom" or "lower" when referring to the fill valve are intended to reference the handle end and discharge end, respectively, of the fill valve, and do not limit the design or orientation of the fill valve once installed on a control valve.

A regulator (not shown) is thus normally connected to the threaded port TP of the control valve, with the control valve including a frustoconical seat FS for sealing with the regulator. The control valve CV may be closed, the regulator removed, and the fill valve 10 connected to the threaded port TP and sealed with the frustoconical seat FS during a propane filling operation.

To facilitate interconnection of a fill valve 10 with the control valve CV as explained above, the fill valve is provided with an elongate discharge nose 14 which includes an outer nose housing 22, a nose sleeve 24, and a nose tip 26. The nose housing 22 includes a handwheel 28 threaded at 29 to the housing 22. The handwheel 28 includes an outer torque surface which may have circumferentially spaced gripping recesses for connecting the housing 22 to the control valve CV without requiring a wrench. The filling operator may thus initially interconnect the threads 30 at the lower end of the housing 22 to the threaded port TP of the control valve, and make up a reliable connection between the fill valve 10 and the control valve CV by applying a selected torque to the housing 22 using only the handwheel 28. The handwheel 28 is thus spaced laterally from the guard G a sufficient distance to manually rotate the hand-wheel 28. During this make-up operation, the housing 22 may rotate about the stationary sleeve 24 connected with the valve body 12, so that the valve body 12 and thus the flexible line FL connected therewith need not rotate. During this make-up operation, axial force will be transmitted from the housing 22 to the nose tip 26 to force the nose tip into reliable sealing engagement with the frustoconical seat FS within the control valve CV. Those skilled in the art will appreciate that various mechanisms may be used to threadably connect the nose housing 22 with the control valve CV, and that the handwheel 28 with a manual torque grasping surface thereon is only an exemplary embodiment for accomplishing this objective.

Figure 2:
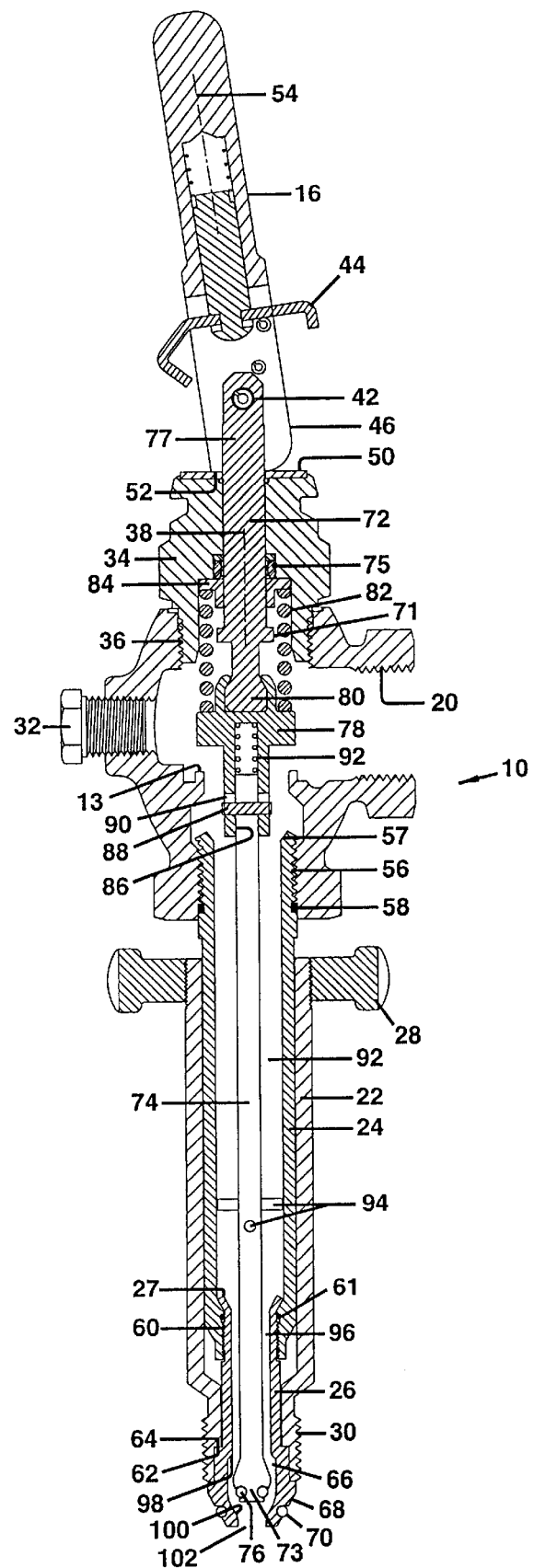
FIG. 2 is a detailed cross-sectional view of the fill valve as shown in FIG. 1, with the fill valve being in the opened position.

FIG. 2 depicts the fill valve 10 in the opened position for transmitting pressurized propane to the control valve CV and then the propane use tank T. The inlet port 20 in the valve body 12 is normally sized for mating connection with a ¾" NPT thread on the flexible hose. The opposing side of the valve body preferably includes a port to optionally interconnect a hydrostatic relief valve to the valve body, with this port being filled for the depicted embodiment by a conventional plug 32. A bonnet 34 is threadably connected at 36 to the valve body 12, and valve stem 18 having a stem axis 38 passes through the bonnet 34, the valve body 12, and the sleeve 24.

Figure 3:
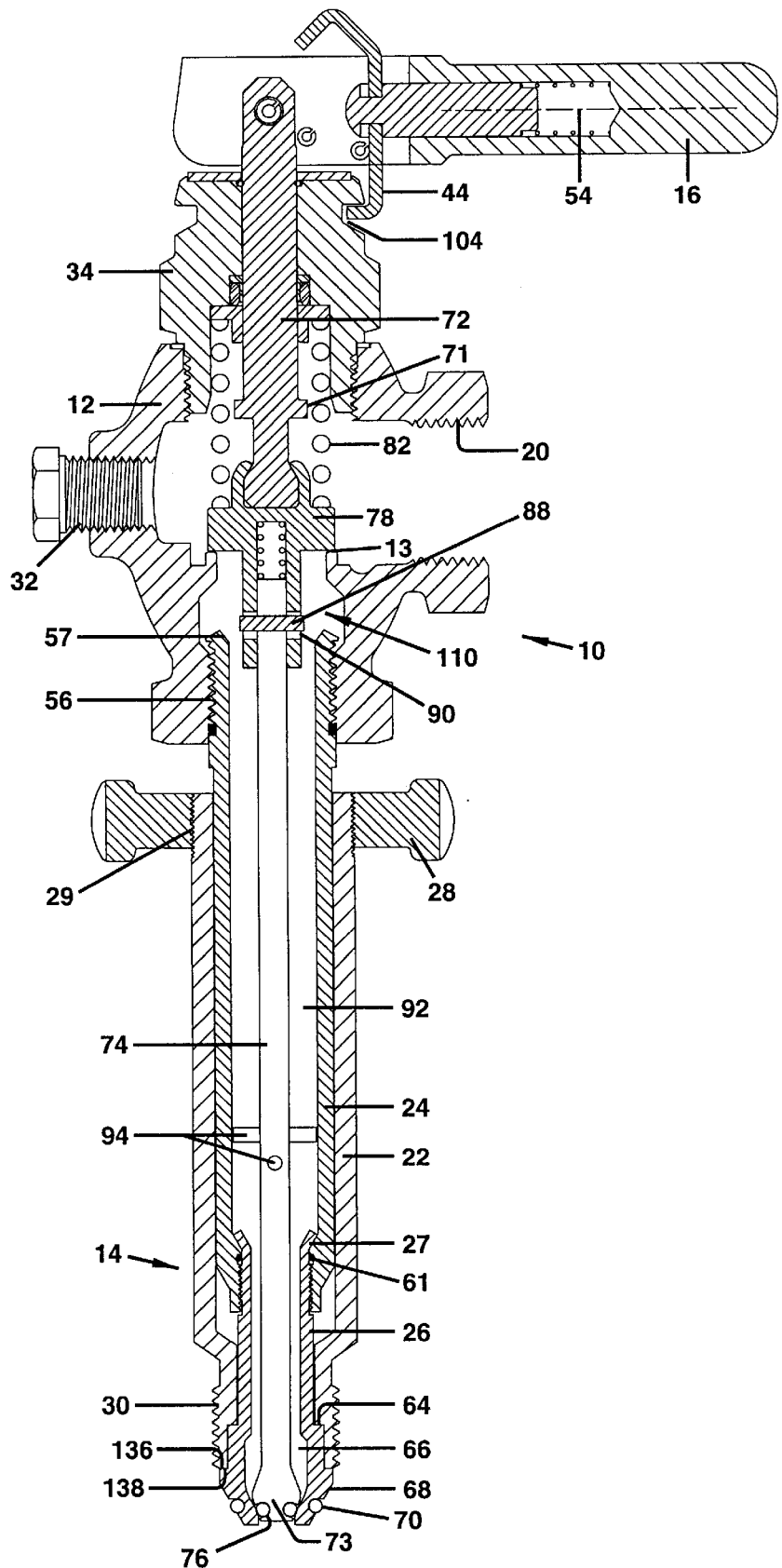
FIG. 3 is a detailed cross-sectional view of the fill valve as shown in FIG. 1, with the fill valve begin in the closed position.

A quick acting pivot handle 16 is pivotably connected to stem 18 by pin 42, and may also include a latch 44 for engagement with the valve body 12 to lock the valve closed, as described subsequently. The handle 16 includes a side surface 46 for engagement with pad 50 on the upper end of the bonnet 34 when the fill valve 10 is in the closed position, and an end surface 52 for engagement with the pad 50 when the valve 10 is in the opened position, as shown in FIG. 2. The centerline 54 of the handle 16 is thus generally horizontal, as shown in FIG. 3, when the fill valve 10 is closed, and is slightly inclined from the vertical, as shown in FIG. 2, when the fill valve 10 is opened. The handle 16 thus typically rotates through an obtuse angle of about 100° between the opened and the closed positions, and this obtuse angle assists in holding the handle 16 and thus the valve in the opened position.

Sleeve 24 is threadably connected to the valve body 12 by threads 56, and is sealed therewith by conventional static O-ring 58. A nose tip 26 is connected via threads 60 to the lower end of the sleeve 24, and is also generally sleeve-shaped. Static O-ring seal 61 seals between the nose tip 26 and the sleeve 24. The nose tip 26 includes a planar surface 62 for engagement with a corresponding surface 64 on the nose housing 22 to force the nose tip into sealing engagement with the control valve CV. The lower end of the nose tip 26 includes a generally barrel-shaped flow passageway 66 therein. A frustoconical exterior surface 68 and an exterior O-ring 70 are provided on the lower end of the nose tip 26 for sealing engagement with the mating frustoconical surface FS in the control valve CV.

The valve stem 18 includes upper stem 72 and lower stem 74, with the lower stem 74 including an expanded diameter end 73 with an elastomeric seal 76 on the lower portion of the end 73. Seal 75 seals between the upper stem 72 and the bonnet 34. The upper stem 72 includes a stem portion 77 and a stem member 78 interconnected by a ball and socket connection 80 which allows rotation of the member 78 with respect to the stem portion 77 to minimize wear on the seal 76 during operation of the fill valve. Coil spring 82 is sandwiched between the upper spring retainer 84 and the stem member 78, and biases the stem member 78 downward towards the discharge nose 14 of the fill valve.

Stem member 78 includes a cylindrical hole 86 therein for receiving the upper end of the generally cylindrical lower stem 74. An adjustment pin 88 passes through a radial hole in the lower stem 74, and is fitted within an enlarged radial hole 90 in the sidewalls of the member 78. A small coil spring 92 biases the lower stem 74 downward away from the upper stem 72, and thus biases the pin 88 toward the lower end of the hole 90. The adjustment mechanism provides a cushioning for the stem seal and obviates a tolerance stack-up problem, as explained below.

The sleeve 24 and lower stem 74 define an elongate annular passageway 92 therebetween for transmitting propane from the fill line to the control valve and then to the tank. A plurality of pins 94 pass through corresponding radial holes in the lower stem 74 and include end surfaces for sliding engagement with the interior surface of the sleeve 24, thereby maintaining the axis of the lower stem 74 properly aligned with the axis of the sleeve 24. A similar annulus 96 is formed between the lower stem 74 and the interior cylindrical surface of the nose tip 26. This annulus 96 is obviously more restrictive than annulus 92, and effectively governs the maximum flow of propane through the fill valve 10 for a given differential pressure. It is important to understand that the left hand thread 30 at the end of the housing 22 is sized for mating engagement with a threaded port TP in a conventional control valve CV, and that the cross-sectional flow area of the discharge port 102 from the nose tip 26 is sufficiently large to meet or exceed the cross-sectional area of prior art fill valves and comply with industry standards for passing propane to fill the tank T in a satisfactory time period.

The nose tip 26 is designed for sealing engagement with the frustoconical seat FS within the control valve CV. Nose tip 26 is also designed so that the expanded diameter end 73 and the elastomeric seal 76 on the portion of end 73 do not substantially restrict the flow of propane to the tank T when the fill valve is open. More particularly, the cross-sectional flow area past the expanded diameter end 73 when the fill valve is fully open is equal to or exceeds the cross-sectional flow area of the discharge opening 102 which, as explained above, is equal to or exceeds the industry standard for prior art fill valves. To accomplish these objectives, the nose tip 26 is provided with a substantially barrel-shaped passageway 66 therein. As shown in FIG. 2, the expanded diameter end 73 of the lower stem 74 is positioned axially substantially midway within the barrel-shaped passageway 66 when the handle 16 is moved to the valve opened position. When the fill valve 10 is opened, the seal 76 is thus spaced axially substantially from both the upper tapered surface 98 and the lower tapered surface 100 which define the barrel-shaped passageway 66 within the nose tip 26. The lower tapered surface 100 is configured for sealing engagement with seal 76 when the fill valve 10 is in the closed position, as shown in FIG. 3.

Referring now to FIG. 3, the handle 16 has been rotated to the closed position so that handle axis 54 is substantially horizontal. A retaining latch 44 may be provided on the handle 16 for fitting within the groove 104 in the bonnet 34, thereby ensuring that the fill valve 10 cannot be inadvertently bumped and the handle 16 moved to the opened position. Instead, the filling operator must first release the interconnection between the latch 44 and the bonnet 34, and then rotate the handle from the closed position as shown in FIG. 3 to the opened position as shown in FIG. 2. This handle releasing operating may be easily accomplished by pressing a thumb against the top of the latch 44 when in the position as shown in FIG. 3 in order to compress the handle spring and move the latch out of the groove 104, then raising the handle 16. When the handle 16 is lowered to the closed position, the substantial biasing force of the spring 82 biases the member 78 downward against the stop 13 on the valve body 12. The significantly less biasing force of spring 92 forces the lower stem 74 and the elastomeric seal 76 at the lower end of the valve stem 18 into sealing engagement with the lower seating surface 100 within the nose tip 26. The pins 94 as discussed above are provided for engaging the interior surface of the sleeve 24, thereby maintaining the axis of the lower stem 74 substantially aligned with the axis of sleeve 24.

Fill valve 10 is provided with an adjustment mechanism 110 as shown in FIG. 3 permits limited axial movement of upper stem 72 with respect to the lower stem 74 when the handle is moved between the opened and closed positions.

The adjustment mechanism 110 allows the large biasing spring 82 to act on the upper valve stem, although substantial shock of the handle closing operation is not transmitted to the lower valve stem 72, and instead is obviated by member 78 engaging stop 13 on the valve body. The relatively light biasing spring 92 thus acts on the lower stem 74 to biasing seal 76 into a cushioned sealing engagement with its seat. By allowing for axial movement between the upper valve stem 72 and the lower valve stem 74, tight tolerances required to precisely position the valve stem so that the seal 76 will reliably seal with the seat 100 when the valve is closed and will position the end 73 midway in the barrel-shaped passageway 66 when the valve is opened need not be maintained. By avoiding tight tolerances, the cost of manufacturing the handle 16, the bonnet 34, the valve body 12, the housing 22, the sleeve 24, and the stem 18 may be minimized.

A suitable adjustment mechanism 110 may include the pin 88 in the lower stem 74, the radial hole 90 in the stem member 78, and the coil spring 92 discussed above. When the valve handle is opened, as shown in FIG. 2, the coil spring 92 biases the lower stem 74 axially away from the upper stem 72, and thus biases the pin 88 within the lower end of the hole 90. While the axial movement of the upper stem 72 is determined by the configuration of the handle 16, the upper stem 72 preferably will axially move a distance greater than the lower stem 74 when the handle 16 is rotated between the closed position and the opened position. When in the opened position, the enlarged diameter end 73 of the lower stem 74 is spaced axially substantially away from both the upper surface 98 and the lower seating surface 100, and preferably is spaced axially substantially midway between these surfaces, as explained above, so as not to substantially restrict the flow of propane through the opened valve 10.

When the handle 16 is rotated closed, the lower stem 74 moves downward with the stem member 78 in response to the substantial biasing force of the spring 82. Once the seal 76 engages the seating surface 100, the upper stem 72 may move downward with respect to the lower stem 74, thereby compressing the coil spring 92 as the seal 76 is pressed into reliable sealing engagement with the seating surface 100. During this downward movement of the upper stem 72 with respect to the lower stem 74, the pin 88 thus moves upward within the hole 90, as shown in FIG. 3. When the fill valve 10 is moved to the closed position as shown in FIG. 3, the axial position of the stem member 78 is controlled by engaging the stem member 78 with the stop 13 provided on the valve body. When the valve is in the closed position, the coil spring 82 thus inherently forces the stem member 78 against the stop 13, thereby fixing the position of the stem member 78 with respect to the valve body 12. The pin 88 and the hole 90 are thus sized to position the end 73 as shown in FIG. 2 approximately midway within the barrel-shaped passageway 66 when the valve 10 is opened. The pin 88, hole 90, and spring 92 are also sized so that the pin 88 is normally out of engagement with the sidewalls of the hole 90, as shown in FIG. 3, when the fill valve 10 is closed.

Although the configuration of the handle 40 may be modified in a newly formed fill valve so that unitary valve stem moves the seal 76 between the closed position and the opened position while positioning the end 73 substantially midway in the barrel-shaped passageway 66 when the valve is in the opened position, the fill valve preferably nevertheless includes an adjustment mechanism 110 as disclosed herein for allowing axial movement of the upper stem 72 which is greater than the axial movement of the lower stem 74.

Since the seal 76 may wear over time with repeated use of the valve, the adjustment mechanism 110 provides a desired buffer to both ensure reliable sealing engagement with the seal 76 and seat 100, and to desirably position the end 73 within the barrel-shaped passageway 66 when the valve is opened. Those skilled in the art will appreciate that various adjustment or buffer mechanisms other than the mechanism 110 as disclosed herein may accomplish the desired objective of allowing axial movement of the lower stem 74 which is less than the axial movement of the upper stem 72 when the fill valve is moved between the opened and the closed positions.

Figure 4:
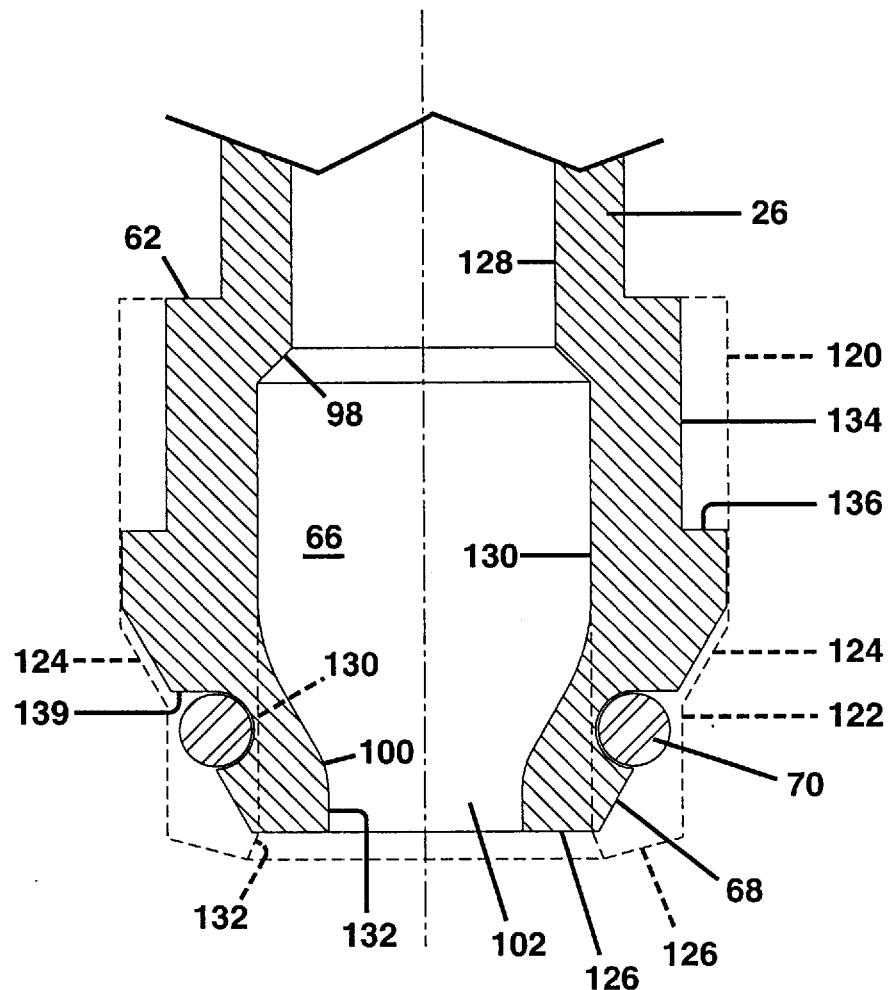
FIG. 4 the detailed cross-sectional view of a lower end of the nose tip generally shown in FIGS. 1 and 2. The nose tip is shown in dashed lines in the originally fabricated position, and in solid lines in its final position after a swaging operation and after machining the outer nose tip surfaces.

Referring now to FIG. 4, the lower end of nose tip 26 is depicted in dash lines in its originally machined configuration, and solid lines in its swaged and machine finished configuration. In its originally machined configuration, the nose tip includes upper exterior cylindrical surface 120 and a lower exterior cylindrical surface 122, with tapered surface 124 connecting cylindrical surfaces 120 and 122. The lower end surface 126 is also slightly tapered, for reasons explained below. The small diameter interior cylindrical surface 128 and the large diameter interior cylindrical surface 130 are connected by upper tapered surface 98 described above. The large diameter cylindrical surface 130 extends to the discharge end of the nose tip 26 or, more preferably extends to the tapered surface 132 which forms a larger diameter discharge opening from the nose tip 26 (as originally manufactured) than the diameter of surface 130. Those skilled in the art will appreciate that a conventional drill or similar cutting tool may be used to machine the interior surfaces 128, 98 and 130 as discussed above. The frustoconical surface 132 may also be formed with a conventional drill.

To form the desired barrel-shaped flow passageway 66 in the nose tip 26 for receiving the expanded diameter end 73 of the stem, the lowermost end of the originally machined nose tip may be deformed radially inward, preferably by a swaging operation. The swaging operation thus forms the generally frustoconical seating surface 100 for sealing engagement with the valve stem seal 76. As the lowermost end of the nose tip is swaged radially inward, the originally machined tapered surface 126 at the lower end of the nose tip becomes a generally horizontal surface, and the originally machined interior tapered surface 132 becomes a generally cylindrical surface 132, as shown in FIG. 4. The swaging operation thus results in an upper generally frustoconical surface 98 which has an apex above the cylindrical wall portion 130 and surface 98, and a lower generally frustoconical seating surface 100 which has an apex below the cylindrical surface 130 and surface 100, thereby forming the desired generally barrel-shaped configuration. If desired, the diameter of the lowermost cylindrical surface 132 may be controlled by redrilling a hole 132 of a desired diameter after the swaging operation is complete, thereby ensuring that the outlet port 102 for the nose tip 26 has a desired minimum nominal diameter.

After the swaging operation is complete, the outer diameter of the nose tip immediately below the planar surface 62 may be reduced with a conventional lathe, thereby forming the reduced diameter cylindrical surface 134 and shoulder surface 136. When the fill valve 10 is installed on the control valve CV, the shoulder surface 136 mates with the end surface 138 on the housing 22 (see FIG. 3) so that these mating surfaces cooperate with mating surfaces 62 and 64 to reliably transmit the force required to seal between the nose tip 26 and the control valve CV. The shoulder 136 also provides more mass and thus strength for the frustoconical surface 68, thereby further ensuring that a desired axial force may be transmitted through the valve stem to form a reliable seal between O-ring 70 and frustoconical seat FS within the control valve CV.

After the swaging operation, an annular groove 139 may be formed in the outer generally frustoconical surface 68 for receiving the O-ring 70 therein. Also, the outer configuration of the frustoconical surface 68 may be finished by a machining operation after the swaging operation. If desired, the lower surface 126 may also be further finished by a machining operation.

Those skilled in the art will appreciate that the nose tip 26 may thus be formed with a generally barrel-shaped interior passageway defined by upper tapered surface 98, cylindrical middle surface 130, and lower tapered surface 100. The barrel-shaped passageway may be formed by the swaging operation at a cost which is substantially less than the cost involved in originally machining the barrel-shaped passageway in the relatively small diameter nose piece.

According to a preferred embodiment, the expanded diameter end 73 of the lower stem portion 74 has a generally barrel-shaped configuration, and the O-ring stem seal 76 is positioned on the lower portion of the end 73 about a generally frustoconical surface of the end 73 having an apex below the stem 18. The maximum diameter of the end 73 is significantly larger than the nominal diameter of the lower stem portion 74 within the nose tip 26 and above the end 73, and preferably the end 73 has a maximum diameter only slightly less than the interior cylindrical surface 128 of the nose tip 26.

A nominal diameter of the discharge opening 102 from the fill valve 10 is at least 0.240 inches, and preferably the opening 102 has a nominal diameter of at least 0.245 inches so as not to substantially restrict the flow of propane from the fill valve. The desired relatively large diameter of the opening 102 inherently causes the valve stem seal to have an effective seal diameter for sealing engagement with seating surface 100 which is larger than the diameter of opening 102. Preferably, the valve stem seal thus has an effective nominal sealing diameter which is at least 0.280 inches, and preferably is at least 0.295 inches. The valve stem seal 76 may have various configurations, with the O-ring 76 and an expanded diameter end 73 being a preferred embodiment. Alternatively, an enlarged diameter stem seal could be mounted on the lowermost end of the valve stem 18 which has a lower stem portion 74 of a uniform diameter. In any event, however, the stem seal must have a diameter greater than the opening 102, and preferably the stem seal has a diameter at least as large as the nominal diameter of the lower stem portion 74 positioned within the nose tip 26, which is intentionally small in order to maintain a large cross-sectional flow passageway 96.

The term "nominal diameter" as used herein with respect to port 102 and stem seal 76 is intended in its normal sense to mean the effective diameter if the component has a generally circular configuration. For example, the port 102 could have a non-circular configuration, in which case the port 102 would still have a nominal diameter which corresponds to the diameter of the port if circular, so as to achieve the purposes and benefits described herein, and particularly the benefits of maximizing flow of propane through the relatively small nose tip.

Those skilled in the art will appreciate that various conventional seals may be provided for static sealing engagement between the sleeve 24 and the nose tip 26. The handle of the fill valve is preferably a quick acting pivot handle, although another handle could be used to axially move the valve stem between the opened and closed positions.

The nose tip 26 is preferably fabricated as a separate component from the sleeve 24 for ease of manufacturing. As shown in FIGS. 2 and 3, the upper end of the nose tip 26 includes radially outward flared portion 27. To form the subassembly of the sleeve 22, the housing 24, and the nose tip 26, the housing 24 may be inserted through the lower end of the sleeve 22, then the nose tip 26 threadably connected at 60 to the sleeve 24. A conventional flaring tool may then be installed through the open upper end of the sleeve 24 to form the radially outward flared portion 27. The subassembly comprising the sleeve 24, housing 22, and nose tip 26 may then be threadably connected at 56 to the valve body 12 and also flared at 57. By providing flared portions 27 and 57, the manufacturer of the fill valve essentially ensures that the user cannot inadvertently remove the sleeve 24 from the body 12, and cannot remove the nose tip 26 from the sleeve 24.

To initially assemble the valve stem 18 within the valve body 12, a subassembly comprising bonnet 34, handle 16 and valve stem 78 (including stem portion 77, member 78 and lower stem 74), and spring 82 may be passed partially through an upper port surrounding valve body threads 38, and the bonnet 34 then threaded to the valve body 12. This same subsequently may be removed from the body 12, sleeve 24 and housing 22 to inspect and replace the seal 76.

The foregoing disclosure and description of the invention is illustrative and explanatory. It will be appreciated by those skilled in the art that various changes in the size, shape and materials, as well as in the details of the illustrated construction or combinations of features and the methods discussed herein may be made without departing from the spirit of the invention.

What is claimed is:

1. A method of manufacturing a fill valve for controlling the flow of propane from a fill line to a control valve having an internal thread and an internal seat, the method comprising:

forming a valve body having a propane inlet for fluid interconnection with the fill line;

interconnecting an elongate sleeve with the valve body;

forming a discharge housing with a discharge end having an external thread for threaded interconnection with the internal thread in the control valve;

rotatably positioning the discharge housing about the elongate sleeve;

securing a nose tip to a lower end of the elongate sleeve;

forming a nose tip with an exterior surface and annular nose tip seal thereon for sealing engagement with the internal seat in the control valve and a fill valve seat defining a portion of a flow passageway through the nose tip;

securing the nose tip to a lower end of the elongate sleeve;

extending a valve stem through the valve body and the elongate sleeve, the valve stem being axially moveable with respect to the valve body between an opened and a closed position;

positioning a lower stem portion of the valve stem within the nose tip, the lower stem portion having a nominal lower valve stem diameter;

biasing the valve stem to the closed position;

connecting a handle to the valve stem for axially moving the valve stem between an opened and a closed position; and positioning a fill valve seal one the lower stem portion of the valve stem for selective engagement and disengagement with the fill valve seat to close and open the fill valve, respectively, the fill valve seal having a nominal seal diameter at least as large as the nominal lower valve stem diameter.

2. The method as defined in claim 1, further comprising:

forming a substantially barrel-shaped passageway defining a portion of the flow passageway through the nose tip, the barrel-shaped passageway including an upper tapered surface with an apex above the upper tapered surface, a lower tapered surface with an apex below the lower tapered surface and defining the fill valve seat, and a cylindrical portion extending axially between the upper tapered surface and the lower tapered surface.

3. The method as defined in claim 2, wherein the lower tapered surface of the barrel-shaped passageway is formed by a swaging operation.

4. The method as defined in claim 1, further comprising:

forming a discharge port from the nose tip with a nominal discharge diameter at least as large as the nominal lower valve stem diameter.

5. The method as defined in claim 1, further comprising:

pivotably interconnecting an upper stem portion with the handle;

supporting the fill valve seal on a lower valve stem portion;

permitting axial movement of the upper valve stem portion with respect to the lower valve stem portion when the valve stem is axially moved between the opened and the closed positions; and biasing the lower valve stem portion axially away from the upper valve stem portion.

6. A fill valve for controlling the flow of propane from a fill line in fluid communication with a propane storage vessel to a control valve in fluid communication with a propane use tank, the control valve having a control valve stem and a handle for engaging and disengaging the control valve stem with a control valve seat, and the control valve having an internal thread and an internal seat, the fill valve comprising:

a valve body having a propane inlet for fluid interconnection with the fill line;

an elongate sleeve interconnected with the valve body;

a discharge housing surrounding the elongate sleeve, the discharge housing including a discharge end having an external thread for threaded interconnection with the internal thread in the control valve;

a nose tip secured to a lower end of the elongate sleeve, the nose tip having an exterior surface with an annular nose tip seal thereon for sealing engagement with the internal seat in the control valve and a fill valve seat defining a portion of a flow passageway through the nose tip;

a valve stem extending through the valve body and the elongate sleeve, the valve stem being axially moveable with respect to the valve body between an opened and closed position, the valve stem having a lower stem portion positioned within the nose tip, the lower stem portion having a nominal lower valve stem diameter;

a handle for moving the valve stem between an opened and a closed position; and a fill valve seal carried on the lower stem portion of the valve stem for selective engagement and disengagement with the fill valve seat to close and open the fill valve, respectively, the fill valve seal having a nominal seal diameter at least as large as the nominal lower valve stem diameter.

7. The fill valve as defined in claim 6, further comprising:

the nose tip flow passageway including a substantially barrel-shaped passageway defining a portion of the flow passageway through the nose tip.

8. The fill valve as defined in claim 7, wherein the barrel-shaped passageway includes an upper tapered surface with an apex above the upper tapered surface, a lower tapered surface with an apex below the lower tapered surface and defining the fill valve seat, and a cylindrical portion extending axially between the upper tapered surface and the lower tapered surface.

9. The fill valve as defined in claim 6, wherein the nose tip has a discharge port with a nominal discharge diameter at least as large as the nominal lower valve stem diameter.

10. The fill valve as defined in claim 6, further comprising:

a spring for biasing the valve stem to the closed position.

11. The fill valve as defined in claim 6, further comprising:

the valve stem including an upper stem portion for interconnection with the handle and a lower stem portion for supporting the fill valve seal thereon; and an adjustment mechanism for allowing axial movement of the upper valve stem portion with respect to the lower valve stem portion when the valve stem is axially moved between the opened and the closed positions.

12. The fill valve as defined in claim 11, wherein the adjustment mechanism includes a biasing member for biasing the lower valve stem portion axially away from the upper valve stem portion.

13. The fill valve as defined in claim 11, further comprising:

a valve stem guide for engagement with a cylindrical internal surface of the elongate sleeve for guiding the lower valve stem portion with respect to the elongate sleeve when the valve stem is moved between the opened and the closed positions.

14. The fill valve as defined in claim 1, further comprising:

the discharge housing having a stop surface thereon;
the nose tip having a flange surface thereon; and
a static seal for sealing between the elongate sleeve and the nose tip.

15. The fill valve as defined in claim 1, further comprising:

the discharge housing being rotatable with respect to the elongate sleeve; and the discharge housing having a torque surface thereon for rotating the discharge housing to threadably connect the discharge housing to the control valve while the elongate sleeve remains substantially non-rotating.

16. A fill valve for controlling the flow of propane from a fill line to a control valve having an internal left-hand thread and an internal seat, the fill valve comprising:

a valve body having a propane inlet for fluid interconnection with the fill line;

an elongate sleeve interconnected with the valve body;

a discharge housing surrounding the elongate sleeve and rotatable about the elongate sleeve, the discharge housing including a discharge end having an external left-hand thread for threaded interconnection with the internal left-hand thread in the control valve;

a nose tip secured to a lower end of the elongate sleeve, the nose tip having a frustoconical surface with an annular nose tip seal thereon for sealing engagement with the internal seat in the control valve and a fill valve seat defining a portion of a flow passageway through the nose tip, the flow passageway having a substantially barrel-shaped passageway portion;

a valve stem extending through the valve body and the elongate sleeve, the valve stem being axially moveable with respect to the valve body between an opened and a closed position, the valve stem having a lower stem portion positioned within the nose tip, the lower stem portion having a nominal lower valve stem diameter;

a spring for biasing the valve stem to the closed position;

a handle pivotably connected with the valve stem for pivoting between an opened and a closed position to axially move the valve stem; and a fill valve seal carried on the lower stem portion of the valve stem for selective engagement and disengagement with the fill valve seat to close and open the fill valve, respectively, the fill valve seal having a nominal seal diameter at least as large as the nominal lower valve stem diameter.

17. The fill valve as defined in claim 16, further comprising:

the valve stem including an upper stem portion for interconnection with the handle and a lower stem portion for supporting the fill valve seal thereon; and an adjustment mechanism for allowing axial movement of the upper valve stem portion with respect to the lower valve stem portion when the valve stem is axially moved between the opened and the closed positions, the adjustment mechanism including a biasing member for biasing the lower valve stem portion axially away from the upper valve stem portion.

18. The fill valve as defined in claim 16, further comprising:

an expanded diameter end at a lower end of the lower valve stem portion; and the fill valve seal is an annular seal surrounding a lower portion of the expended diameter end for sealing engagement with the fill valve seat.

19. The fill valve as defined in claim 16, wherein the barrel-shaped passageway includes an upper tapered surface with an apex above the upper tapered surface, a lower tapered surface with an apex below the lower tapered surface and defining the fill valve seat, and a cylindrical portion extending axially between the upper tapered surface and the lower tapered surface.

20. The fill valve as defined in claim 16, wherein the nose tip has a discharge port with a nominal discharge diameter at least as large as the nominal lower valve stem diameter.

* * * * *

UNITED STATES PATENT AND TRADEMARK OFFICE
CERTIFICATE OF CORRECTION

PATENT NO. : 5,836,352
DATED : November 17, 1998
INVENTOR(S) : Spencer M. Nimberger It is certified that error appears in the above-indentified patent and that said Letters Patent is hereby corrected as shown below:

In column 13, line 42, "claim 1" should read --claim 6--.

In column 13, line 48, "claim 1" should read --claim 6--.

Signed and Sealed this

Sixteenth Day of March, 1999

Attest:

Q. TODD DICKINSON

*Attesting Officer*   *Acting Commissioner of Patents and Trademarks*